United States Patent
Moutton et al.

(10) Patent No.: US 8,122,696 B2
(45) Date of Patent: Feb. 28, 2012

(54) GUIDES FOR AN EXTENDABLE HARVESTING HEADER

(75) Inventors: Bart Moutton, Gits (BE); Mateusz Rajca, Wroclaw (PL); Danny A. H. Descheemaecker, Veldegem (BE)

(73) Assignee: CNH America LLC, New Holland, PA (US)

( * ) Notice: Subject to any disclaimer, the term of this patent is extended or adjusted under 35 U.S.C. 154(b) by 146 days.

(21) Appl. No.: 12/459,709

(22) Filed: Jul. 7, 2009

(65) Prior Publication Data

US 2010/0011731 A1    Jan. 21, 2010

(30) Foreign Application Priority Data

Jul. 8, 2008  (EP) .................................. 08159966

(51) Int. Cl.
*A01D 67/00*    (2006.01)

(52) U.S. Cl. .......................................... 56/208; 56/15.5

(58) Field of Classification Search ................ 56/2, 208, 56/210, 228, 279, 280, 282, 287, 301, DIG. 20, 56/162, 181, 219, 153, 15.5, 221
See application file for complete search history.

(56) References Cited

U.S. PATENT DOCUMENTS 3,481,490 A * 12/1969 Eiler ............................. 212/350
(Continued)

FOREIGN PATENT DOCUMENTS

DE    1237374    3/1967
(Continued)

*Primary Examiner* — Thomas Will
*Assistant Examiner* — Joan Misa
(74) *Attorney, Agent, or Firm* — Michael G. Harms; Sue Watson

(57) ABSTRACT

An header of the extendable type comprises a main frame and an extendable cutterbar table, which is mounted to the main frame by means of telescopic assemblies comprising an inner member mounted for sliding movement inside an outer member. One of the inner and outer members has longitudinal, inclined side walls that are engaged by inclined slide surfaces of guide means connected to a wall of the other of said outer and inner members, opposite said inclined side wall.

13 Claims, 4 Drawing Sheets

U.S. PATENT DOCUMENTS

| | | | | |
|---|---|---|---|---|
| 4,011,709 | A * | 3/1977 | Mott et al. | 56/10.4 |
| 4,148,531 | A * | 4/1979 | Hornagold | 384/35 |
| 4,208,847 | A * | 6/1980 | Gaura et al. | 52/118 |
| 4,357,785 | A * | 11/1982 | Eklund | 52/632 |
| 4,478,014 | A * | 10/1984 | Poock et al. | 52/115 |
| 4,800,711 | A * | 1/1989 | Hurlburt et al. | 56/219 |
| 5,158,189 | A * | 10/1992 | Watson et al. | 212/350 |
| 5,711,140 | A * | 1/1998 | Burmann | 56/208 |
| 5,829,606 | A * | 11/1998 | Erdmann | 212/350 |
| 5,865,328 | A * | 2/1999 | Kaspar | 212/350 |
| 6,601,654 | B2 * | 8/2003 | Kusters et al. | 172/439 |
| 6,726,437 | B2 * | 4/2004 | Albright et al. | 414/728 |
| 7,082,742 | B2 * | 8/2006 | Schrattenecker | 56/208 |
| 2007/0098536 | A1 * | 5/2007 | Kooima | 414/563 |
| 2011/0005184 | A1 * | 1/2011 | Conrad et al. | 56/181 |

FOREIGN PATENT DOCUMENTS

| | | |
|---|---|---|
| DE | 102004024232 | 12/2005 |
| EP | 0726025 | 8/1996 |

\* cited by examiner

GUIDES FOR AN EXTENDABLE HARVESTING HEADER

CROSS REFERENCE TO RELATED APPLICATIONS

This Patent Application claims priority under 35 U.S.C. §119 to EP 08.159.966.4, filed on Jul. 8, 2008 titled, "Guides for an Extendable Harvesting Header" and having Bart Moutton, Mateusz Rajca and Danny A.H. Descheemaecker as inventors. The full disclosure of EP 08.159.966.4 is hereby fully incorporated herein by reference.

FIELD OF THE INVENTION

The present invention relates to guides for the movable cutterbar table of an extendable header for a harvesting machine.

BACKGROUND OF THE INVENTION

Typically, a header for a harvesting machine includes a cutterbar which is operable to cut standing crop as the machine moves forward and a rotatable reel which carries tines to engage the standing crop and sweep it towards the cutterbar for cutting and then carry the cut material towards an auger before releasing it. The auger usually consolidates the cut crop material centrally of the header before it is passed on to an elevator and therefrom into the body of the machine for processing. The position of the cutterbar in relation to the auger is critical and in general depends on the type and condition of the crop to be harvested. Small grain crops usually allow a relative small distance between the cutterbar and the auger, while crops such as long-stemmed grains and canola are harvested better with the cutterbar set at a larger distance from the auger. For these reasons the cutterbar and the associated table section may be made adjustable in a generally fore-and-aft direction of the header.

Known systems, as described in EP-A-0 250 649, provide a series of outer guides with associated inner sliding guides for moving the table forward or backwards in relation to the header frame. A problem associated with these is the metal-on-metal contact limiting the lifetime of the guides. Using replaceable metal wear blocks in the front of the header is known, but a problem with these is that dirt is scooped in front of the header due to the location of the wear blocks. Furthermore, the vertical range of the movable header is limited by the extra space taken by the wear blocks. The minimum stubble height is hereby limited.

Another problem with current U-shaped or rectangular guides is the lateral movement that is caused by the side movement of the knives. The guides have some lateral clearance and the forces generated by the knife movement on the frame are significant, in such a way that the movable table continuously shifts sideways during cutterbar operation. This limits the lifetime of the header considerably.

It is therefore an object of the present invention to limit the lateral movement of the movable header table and to increase its lifetime.

SUMMARY OF THE INVENTION

According to the present invention there is provided a header for a harvesting machine, said header comprising:
a main frame; and
an extendable cutterbar table movably mounted to the main frame by means of telescopic assemblies, each assembly comprising a forwardly extending outer member and an inner member mounted for sliding movement inside the outer member,
characterised in that at least one of said telescopic assemblies comprises an outer or inner member having a longitudinal, inclined side wall that is engaged by an inclined slide surface of a guide means connected to a wall of the other member of said at least one telescopic assembly, opposite said inclined side wall.

The present invention has some important advantages. The inclined side wall provides for a fixed position of the cutterbar table with no clearance between the member and the slide surface of the telescopic assembly. Consequently, the lateral vibrations induced by the reciprocating cutterbar will not result in lateral movement of the table to the header frame. The header is much more stable and works more quietly. This also reduces the wear between the telescopic members. A single inclined wall would suffice, but a pair of inclined walls is preferable, giving the telescopic member an overall V-shape.

The inclined side wall or side walls may be arranged at an angle of about 45° to the horizontal, which provides a positive position for the cutterhead table, but does not clamp the members into each other.

The guide means may comprise wear parts that can be replaced. The use of replaceable wear parts reduces the effects of wear on the frame and the movable table. They may include caps or strips on the front end of the telescopic assembly. Furthermore, the guides may be adjusted, e.g. by screws, so as to compensate for wear and take away the possibility for lateral displacement of the movable table. The adjustment can also be used to minimise the vertical clearance between the inner and outer telescopic members. This improves the stability of the header table during operation.

A further advantage is that the wear guides of the present invention have no parts sticking out of the bottom of the header, hereby preserving the minimum available stubble height.

BRIEF DESCRIPTION OF THE FIGURES

The invention will now be described in further detail, by way of example, with reference to the accompanying drawings, in which.

DETAILED DESCRIPTION OF THE PREFERRED EMBODIMENTS

Figure 1:
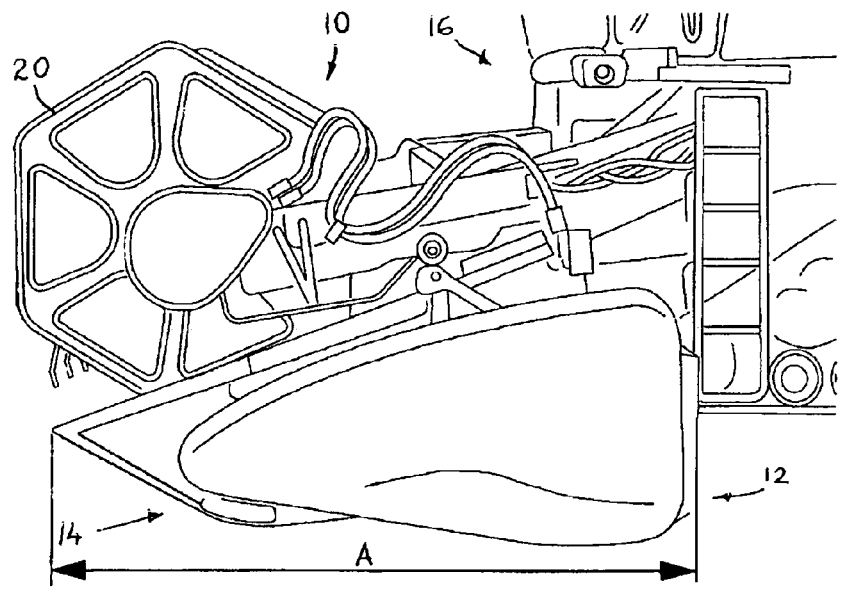
FIG. 1 is a left side view of an extendable header attached to the front of a combine harvester.

FIGS. 1 to 6 illustrate an extendable header 10 comprising a main frame 12 and a movable cutterbar table 14. The main frame 12 is releasably attached to an elevator of a combine harvester 16 and supports a transverse auger (not shown), which can be rotated to transport crop from the cutterbar table 14 to a central outlet opening 18 adjacent the elevator. The cutterbar table 14 comprises a cutterbar having a range of knives (not shown), which are reciprocated by an appropriate cutterbar drive (not shown) for cutting standing crop as the combine harvester 16 is travelled over a field. The header frame 12 is provided with a reel 20, which extends the full width of the header and can be rotated to guide the standing crop to the cutterbar table 14 and the cut crop to the transverse auger. The header 10 incorporates an embodiment of an improved guidance of the movable cutterbar table 14 according to the present invention.

The movable table 14 of the harvesting header 10 is connected to the header frame 12 by means of telescopic assemblies 22, each comprising a pair of telescopic members 24, 26. The outer members 24 are mounted at the bottom of the main header frame 12; the inner members 26 are mounted to the bottom of the movable cutterbar table 14 and extend rearwardly into the outer members 24. The telescopic members have downwardly and inwardly inclined side walls 28, 30, giving the members a cross-sectional V-shape. Depending on the width of the header 10, at least a two, but preferably four, five or six pairs of telescopic guide assemblies 22 are provided (two shown in FIG. 2).

The present invention provides for telescopic member assemblies 22 that prevent the sideways movement of the cutterbar table 14 and decrease the consequent wear by using inclined longitudinal guide surfaces.

In a preferred embodiment these inclined guide surfaces are constituted by the side walls 30 of the inner telescopic member 26. These may be arranged at a downward and inward angle of about 45° to the bottom of the cutterbar table 14. Alternatively, these may be arranged at a downward and inward angle of about 50° to the bottom of the cutterbar table 14. The side walls 30 may be connected to each other at the bottom of the member and thereby provide a triangular cross section, but in the embodiment illustrated they end at a horizontal plate 32 that closes the bottom of the inner member 26.

Figure 2:
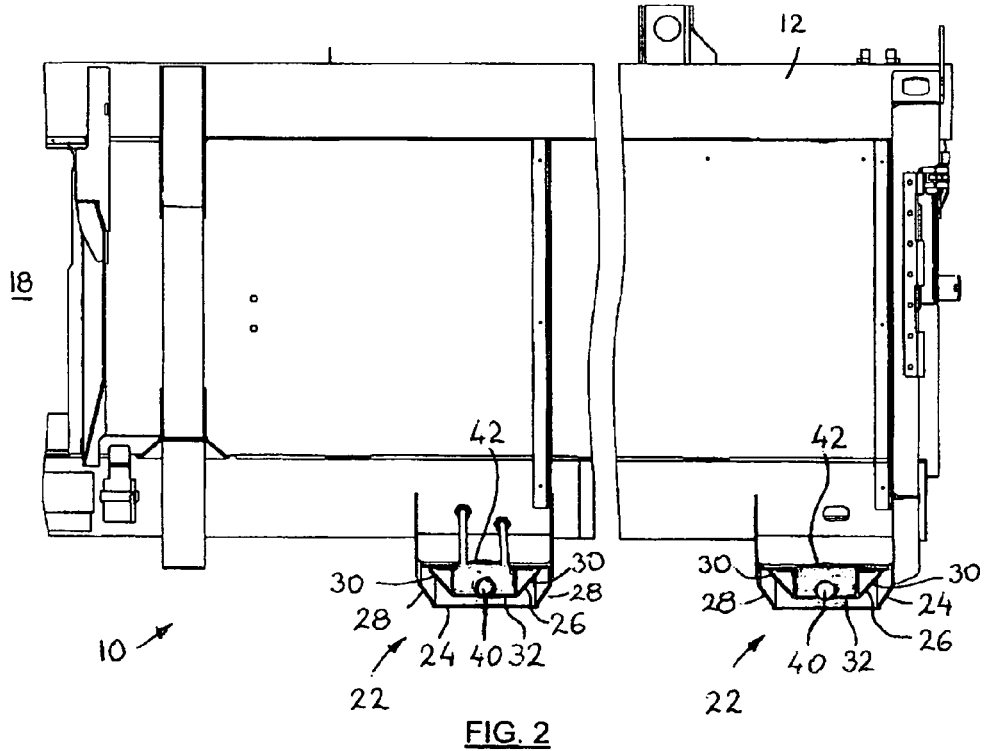
FIG. 2 is a partial rear view of the right hand section of the extendable header of FIG. 1 showing a pair of telescopic guide assemblies.
Figure 3:
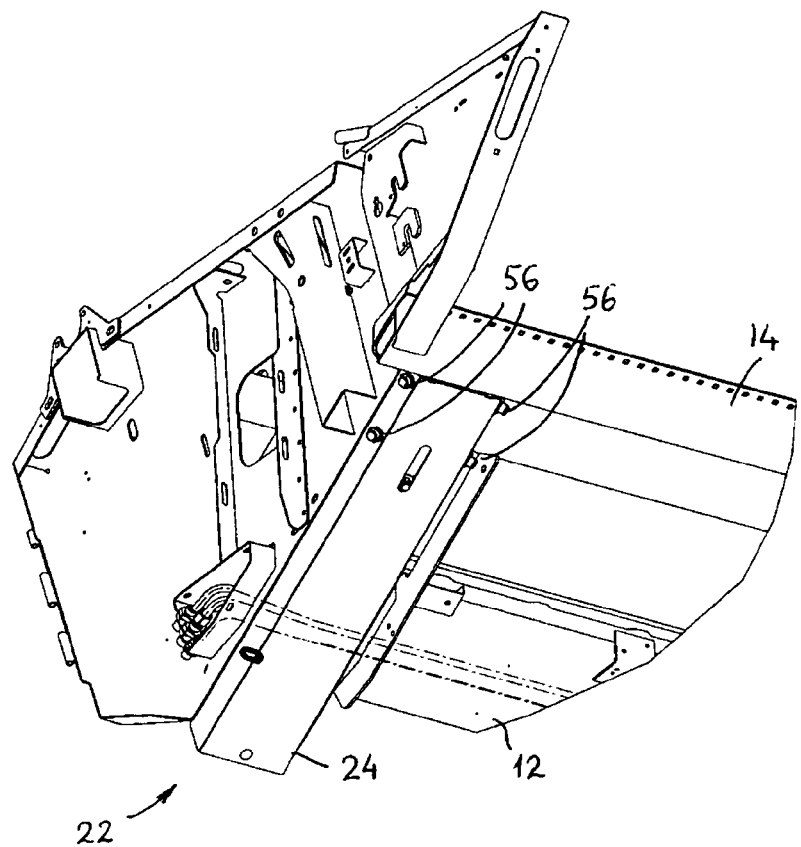
FIG. 3 is a perspective view from underneath of the right hand section of FIG. 2, showing part of the main frame and the cutterbar table and one of the telescopic guide assemblies.
Figure 5:
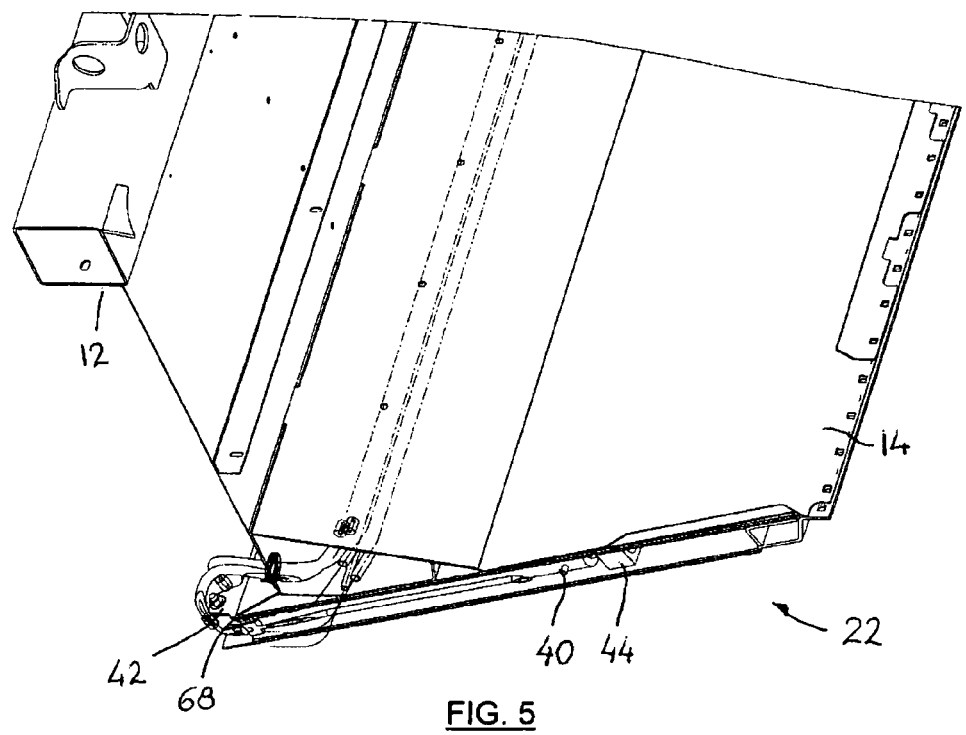
FIG. 5 is perspective cross sectional view of the guide assembly of FIG. 3 in a longitudinal direction.

As illustrated in FIGS. 2 and 5, the space inside the inner member 26 is used for installing a linear actuator, such as a hydraulic cylinder 40 or an electrical actuator comprising a screw and rod assembly. The rear end of the actuator is connected to a lug 42 at the rear of the header frame 12 and the front end to a block 44, welded to the interior of the member 26. The actuators of the telescopic assemblies 22 can be extended and retracted simultaneously for adjusting the forward position of the table 14 and its cutterbar as indicated by arrow A in FIG. 1.

The outer telescopic members 24 are provided with guide means 50, which slidingly support the inner telescopic members 26 during and after their fore-and-aft movement. The guide means 50 comprise inclined slide surfaces 52, which are arranged against the side walls 30 of the inner member 26. The surfaces 52 preferably are made out of plastic material such as polyethylene or polyamide, but also other low friction material may be used.

Figure 4:
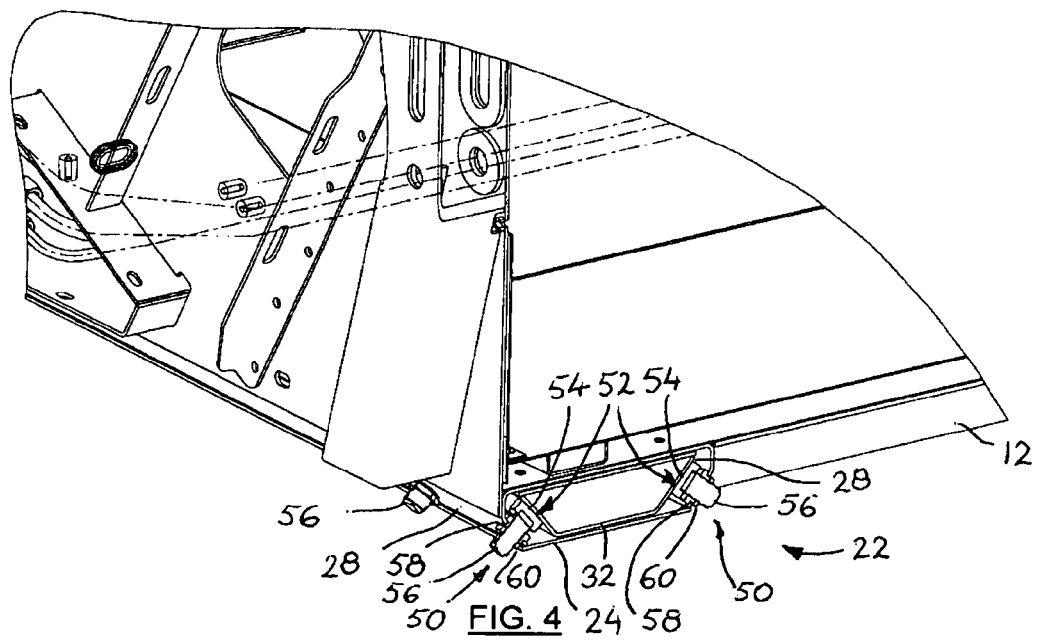
FIG. 4 is a perspective cross sectional view of the guide assembly of FIG. 3 in a transverse direction across a pair of slide surfaces of the telescopic guide assembly.
Figure 6:
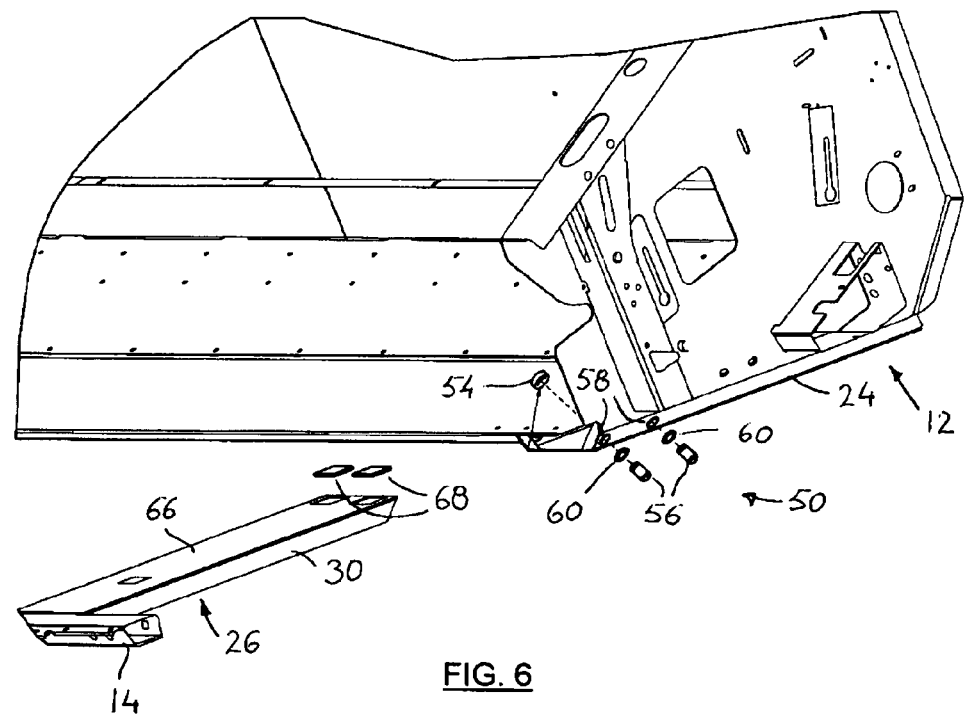
FIG. 6 is an exploded view of the telescopic guide assembly of FIG. 3.

As shown in FIGS. 4 and 6, the guide means 50 comprise replaceable plastic caps 54 that are mounted on screws 56. These screws are set in threaded bushings 58 that are welded to the inclined side walls 28 of the outer telescopic member 24. The position of the caps 54 and hence of the inner member 26 can be adjusted by rotating the screws 56. The operator then secures them by lock nuts 60 on the outside of the side walls 28.

The guide means 24 preferably comprises four sets of screws 56 and caps 54, all arranged near the front end of the outer telescopic member 24. The screws can be adjusted for compensating for wear of the slide surfaces 52. The operator wishing to replace the caps 54 can turn the screws 56 outwardly, remove the worn caps and insert new caps through the front space between the inner and outer telescopic members 26, 24.

In an alternative embodiment, the guide means may comprise V-shaped wear blocks, which are inserted into the telescopic assembly 22 between the inner and outer members 26, 24. In another embodiment a V-shaped wear coating is provided into the guides.

In another embodiment the guides are U-shaped, or any other shape, and an adapted wear block or coating is provided having an inner V-shape.

Said wear blocks are removable. Said coating may also be removable. Said coating may be provided completely or partly along the inner side of the guides. Said coating may also be provided along the outside of the associated guide.

In a preferred embodiment said wear block or coating comprises plastic. In a more preferred embodiment said plastic comprises polyamide and/or polyethylene. Said plastic provides excellent sliding and wearing properties.

As illustrated in FIGS. 5 and 6, the inner telescopic member 26 has a top wall 66, which is provided with a pair of wear pads 68. After mounting the cutterbar table 14 to the main frame 12, the weight of the table 14 and the cutterbar will load the rear of the inner telescopic member 26 and the pads 68 against the top wall of the outer member 24. The wear pads 68 may be made out of plastic or another low friction material. They may be removably inserted into cavities in the top wall 66 for replacement when they are worn out.

The inclined arrangement of the side walls 30 of the inner telescopic member 26 and the slide surface 52 ensures that the cutterbar table 14 is kept stable against sideward movement. The wedging action of the telescopic assembly 22 determines the lateral position of the cutterbar table by taking away any clearance between the slide surfaces 52 and the inclined side walls 30, but does not lock the table 14 in a longitudinal direction, thereby allowing the extension of the header 10. The angle of the inclined walls 30 has to be sufficient to prevent vertical vibration of the cutterbar table 14 under the transverse oscillation of the cutterbar in action, but may not be too large to prevent self-locking of the telescopic assembly 22.

Figure 7A:
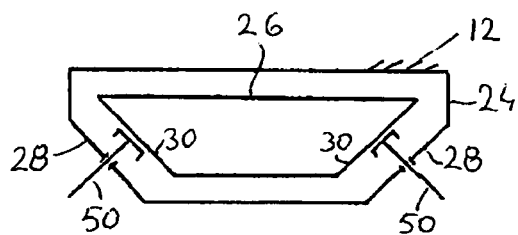
FIGS. 7A-D are schematic cross sections of alternative telescopic guide assemblies whereof the outer guide member is connected to the main frame of the header and the inner member to the movable cutterbar table.
Figure 7B:
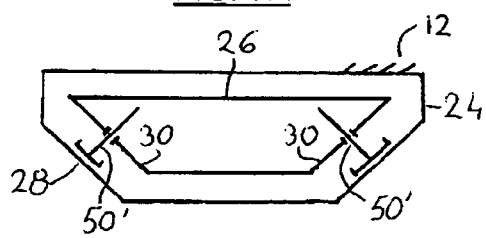

FIGS. 7A-D and 8A-D illustrate alternative embodiments for telescopic assemblies according to the invention. The arrangement of FIG. 7A corresponds to the configuration of FIGS. 2 to 7, wherein the outer member 24 is attached to the header main frame 12 and the inner member 26 is connected to the cutterbar table 14. The adjustable guide means 50 extend inwardly from the outer member 24. FIG. 7B shows a similar arrangement for the members 24, 26, but the adjustable guide means 50' (the screws) now extend downwardly from the inner member 26 into the space between the inner and outer telescopic members. The centring effect of the inner member is now realised by the inclined outer walls 28. The advantage of this embodiment is that no screws extend below the header bottom anymore, but the disadvantage is that the screws are less accessible for adjustment.

Figure 7C:
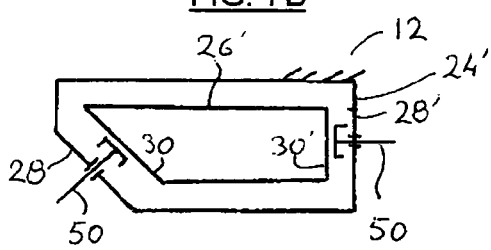
Figure 7D:
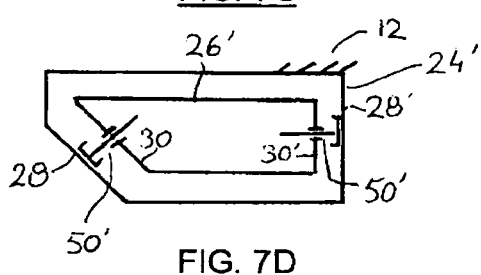

FIGS. 7C and 7D are similar to FIGS. 7A and 7D. The main difference is the orientation of one pair of side walls 28', 30', which are no longer inclined but upright. The inclined walls 28, 30 on the opposite side still provide the wedging effect that will assume the clearance and restrain the inner members 26' of the cutterbar table 14 from oscillating laterally inside the outer members 28'.

Figure 8A:
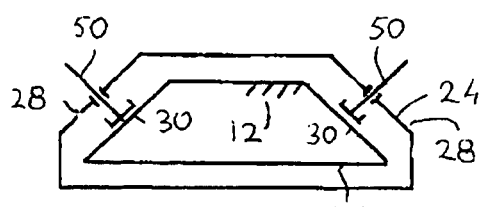
FIGS. 8A-D are schematic cross sections of further alternative guide assemblies whereof the inner guide member is connected to the main frame of the header and the outer member to the movable cutterbar table.
Figure 8B:
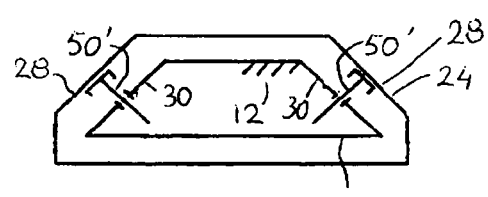
Figure 8C:
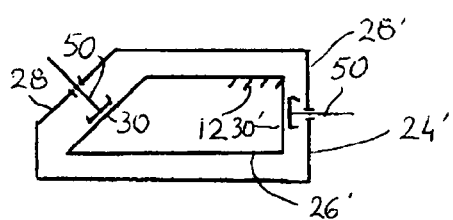
Figure 8D:
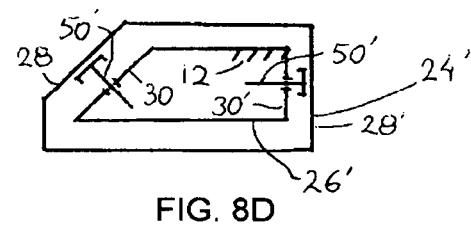

FIGS. 8A to 8D illustrate further embodiments. Herein the outer telescopic members 28 are attached to the movable cutterbar table 14 and the inner members 26 to the header main frame 12. This implies that the inner members 26 extend in a forward cantilever manner from and below the frame 12. The side walls 28, 30 are now inclined downwardly and outwardly to keep the outer members 28 centred on the inner members 26. FIGS. 8A and 8C show telescopic assemblies wherein the guide means 50 are mounted through the outer telescopic members 24/24' and FIGS. 8B and 8D show assemblies wherein the guide means 50 are mounted through the inner members 26/26' towards the outer members 24/24'.

Although the invention has been described with reference to particular embodiments, it will be understood that the invention is not limited thereto and that skilled person may develop further alternative embodiments without departing from the scope of the invention as defined by the claims. For instance, the pair of caps 54 of the guide means 50 may be replaced with a slide lath of plastic material.

The invention claimed is:

1. A header for a harvesting machine, said header comprising:
   a main frame; and
   an extendable cutterbar table movably mounted to the main frame by a plurality of telescopic assemblies, each said telescopic assembly comprising a forwardly extending outer member and an inner member mounted for sliding movement inside the outer member, the inner member configured to include at least one longitudinal inclined side wall and at least one other wall which together form an acute angle at their junction, the outer member configured to include at least one side wall and at least one other wall which together form a right angle at their junction,
   wherein said walls forming the acute angle of the inner member are positioned next to said walls forming the right angle of the outer member, and
   wherein a surface of one of the outer member or the inner member is contacted by at least one guide means connected to and extending through a wall of the other of the outer member or the inner member, wherein a portion of the at least one guide means permits adjustment of the at least one guide means relative to the surface contacted.

2. A header according to claim 1, wherein the at least one inclined side wall has an angle of about 50° to the cutterbar table.

3. A header according to claim 1, wherein the outer member is attached to the main frame and the inner member is attached to the cutterbar table.

4. A header according to claim 1, wherein the inner member is attached to the main frame and the outer member is attached to the cutterbar table.

5. A header according to claim 4, wherein the outer member includes at least one longitudinal inclined side wall.

6. A header according to claim 1, wherein the at least one guide means is disposed near a front end of the one of the inner member or the outer member to which said at least one guide means is connected.

7. A header according to claim 1, wherein each guide means includes a slide surface, and wherein a replaceable wear part is provided with the slide surface.

8. A header according to claim 7, wherein the replaceable wear part comprises a cap made out of plastic material.

9. A header according to claim 7, wherein the replaceable wear part comprises a wear block having an inclined slide surface.

10. A header according to claim 1, wherein the guide means is adjustable for removing clearance between the inclined side wall and a slide surface of the guide means.

11. A header according to claim 1, wherein the guide means comprise a screw inserted into a threaded bushing connected to one wall of the outer member.

12. A header according to claim 1, wherein each said telescopic assembly comprises a wear pad attached to a top wall of a rear end of the inner member.

13. A header according to claim 1, wherein the inclined side wall has an angle of about 45° to the horizontal.

* * * * *